July 28, 1959
L. R. CAMPBELL
2,896,579
CONTROL VALVE CONSTRUCTION FOR PNEUMATIC POWER TOOLS
Filed Sept. 9, 1957
2 Sheets-Sheet 1
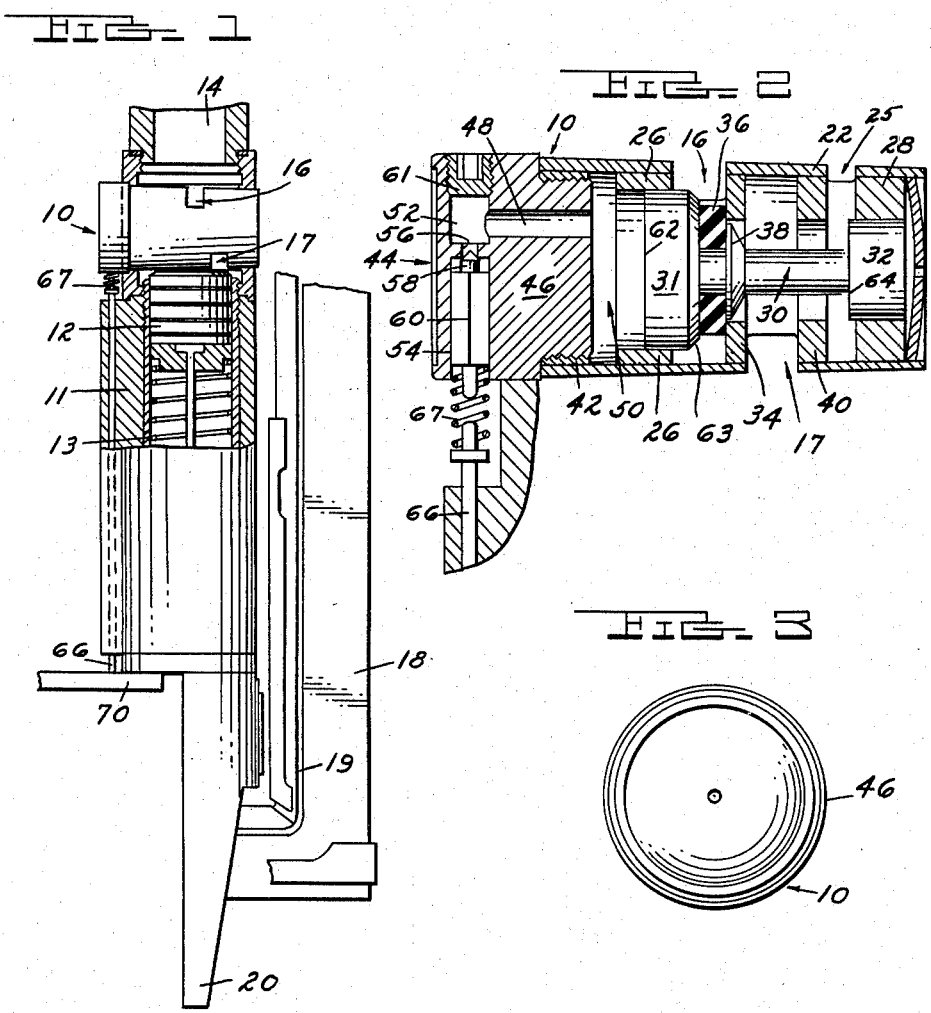
INVENTOR.
LEE R. CAMPBELL
BY
ATTORNEYS July 28, 1959  L. R. CAMPBELL  2,896,579
CONTROL VALVE CONSTRUCTION FOR PNEUMATIC POWER TOOLS
Filed Sept. 9, 1957  2 Sheets-Sheet 2
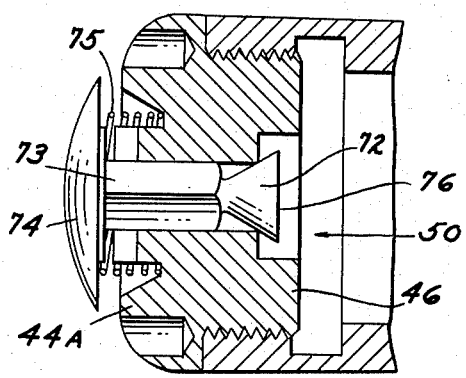
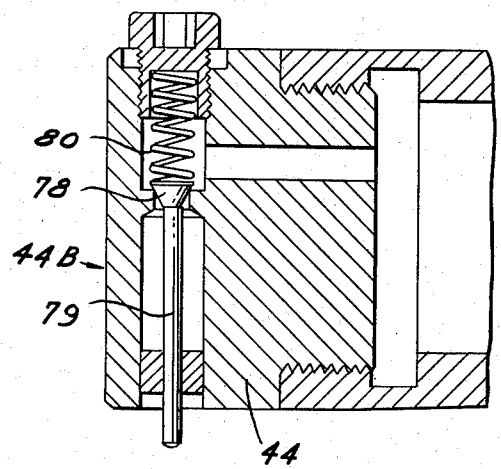
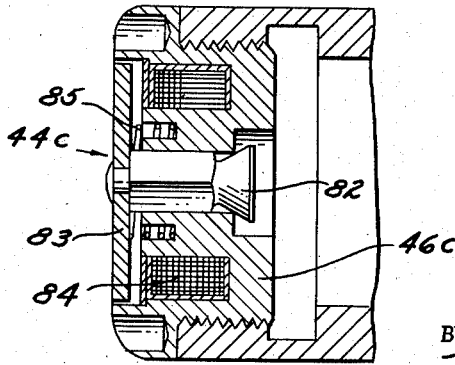
INVENTOR.
LEE R. CAMPBELL
BY
ATTORNEYS

United States Patent Office 2,896,579
Patented July 28, 1959

2,896,579

CONTROL VALVE CONSTRUCTION FOR PNEUMATIC POWER TOOLS

Lee R. Campbell, Royal Oak, Mich.

Application September 9, 1957, Serial No. 682,823

10 Claims. (Cl. 121—21)

This invention relates to an improved valve and valve triggering means for controlling the operation of pneumatically operated power tools. The invention has proved to have particular utility in connection with the operation of air stapling guns and will be described in this embodiment.

Some difficulty has been experienced in obtaining a valve for a stapling gun which is best suited for comfort of the operator. It has been difficult to obtain a proper balance between sensitivity of the control afforded by the valve and operator fatigue. Fatigue can be reduced by increasing sensitivity but difficulty has been experienced in keeping the sensitivity below the point where the gun can be accidentally fired too easily.

A number of types of air stapling guns have been developed, each presenting its own peculiar control requirements. In addition to hand operated guns, other types have been developed for automatic operation such as in response to relative movement between the gun and a part to be stapled. In other situations, remote actuation may be desirable.

The present invention provides a valve having an indirect control or triggering element which operates entirely independently, at least in a mechanical sense, of movement of the valve itself. Any degree of sensitivity or feel that is desirable can thus be provided. The present invention also provides a valve body of standardized construction which can be used in combination with any one of a number of alternate control or triggering constructions. The control portion of the construction consists of a separate sub-assembly removably mounted on the valve body. Since the main valve element is indirectly controlled, one of these sub-assemblies can readily be substituted for another without affecting the over-all operation of the valve but at the same time obtaining such operation by a different controlling mechanism.

As a result the valve construction of the invention can be used in many types of air stapling guns or other pneumatically operated power tools by merely substituting the proper style of control assembly.

Representative embodiments of the invention are disclosed in presently preferred form in the accompanying drawings which consists of the following views:

Fig. 1 an elevation partly in section showing the main portion of a particular type of air stapling gun with the valve assembly of the invention used to control the operation thereof;

Fig. 2 a sectional elevation on an enlarged scale of the valve construction used in Fig. 1;

Fig. 3 an end view of the construction shown in Fig. 2; and

Figs. 4, 5 and 6, each an enlarged sectional elevation showing an alternate type of control sub-assembly for the valve construction of Fig. 2.

The setting of the invention will be described briefly with reference to Fig. 1 where the improved valve, generally designated 10, is shown mounted in one type of stapling gun. This gun includes a cylinder 11 containing a piston 12 and staple driver 13 whose operation is controlled by the valve 10. When the valve is operated air is admitted from the chamber or passage 14 through inlet and outlet ports 16 and 17 of the valve to the cylinder 11 to force the piston and staple driver on a driving stroke. The staple driver then engages a staple (not shown) fed into the driver guide in the nose 20 of the gun from a magazine 18 which includes a staple track 19.

Referring to Fig. 2, valve 10 includes a valve body of composite construction. The body consists of an externally tapered sleeve 22 having the inlet and outlet ports 16 and 17, and an exhaust port 25 formed in its side wall. Internally the sleeve is divided into a number of compartments by a series of annular members which preferably are formed separately, then individually pressed into the sleeve to the proper position and brazed to the sleeve. Two of these members designated 26 and 28 slidably support a valve 30 which has a cylindrical portion 31 engaging the member 26 and a cylindrical portion 32 engaging the member 28.

A third internal member 34 is located longitudinally of the sleeve 22 intermediate the inlet and outlet ports 16 and 17 and forms a seat for a sealing ring 36 carried by the valve between the portion 31 and a retainer 38.

Another internal member 40 is located longitudinally of the sleeve intermediate the outlet and exhaust ports 17 and 25 and acts in conjunction with valve portion 32 to control opening and closing of the passage between these two ports.

The last member pressed within the sleeve 22 is an internally threaded ring 42 which provides a mounting for the detachable control assembly generally designated 44. In Fig. 2, control assembly 44 consists of a generally cylindrical plug 46, threaded to engage the ring 42, and provided with a drilled passage 48 leading from a chamber 50 formed within the sleeve 22 between the end of the plug 46 and end portion 31 of the valve. A cylindrical pair of passages 52 and 54 are drilled end to end at right angles to the passage 48 to form an orifice 56 normally sealed by a needle valve 58 having a square valve body 60. Passage 52 is closed by a threaded plug 61, but when needle valve 58 is opened, communication is established between the chamber 50 and atmosphere through passage 54.

Fig. 2 shows main valve 30 in closed position. Movement of the valve between this position and opened position is obtained from the forces which result from air pressure acting on certain surfaces of the valve. These surfaces include the end surface 62 of valve portion 31, the oppositely disposed surfaces 63 of valve portion 31 and the similarly disposed surface 64 of valve portion 32. End surface 62 is considerably larger in area than the oppositely disposed surface 63.

The operation is as follows:

Sufficient clearance is provided between valve portion 31 and its supporting member 26 to bleed inlet pressure from port 16 to the chamber 50, and as long as needle valve 58 is closed the resulting force on end surface 62 will hold the main valve in closed position, blocking the passage between the inlet and outlet ports 16 and 17. In this valve position the passage between outlet and exhaust ports 17 and 25 is open. When needle valve 58 is opened, pressure in chamber 50 is reduced and the inlet pressure at port 16, acting on valve surface 63, produces a force sufficient to move the valve 30 to opened position, opening a passage between inlet and outlet ports 16 and 17 while simultaneously closing the passage between outlet and exhaust ports 17 and 25. When needle valve 58 is again closed pressure builds up in chamber 50 and the resulting force on valve surface 62, augmented by the force produced by pressure on valve surface 64 returns the valve 30 to closed position instantly.

Thus, the control sub-assembly 44 is in a sense a means of regulating the pressure on at least one of two opposed surfaces of the valve 30, these being the surfaces 62 and 63, to produce a force differential on the valve 30 in a direction of opening or closing movement thereof.

The construction of Figs. 1 and 2 is one where actuation of the stapling gun is desired in response to movement of the article to be stapled into contact with the nose 20 of the gun. Needle valve 58 is held in closed position by an actuating rod 66 and a spring 67 positioned intermediate the end of the needle valve body 60 and the end of the actuating rod 66. The other end 68 of the actuating rod rests against a fixed support 70, while the gun as a whole is supported by means not shown for upward vertical movement when an article is brought into contact with its nose 20. As this contact takes place, the gun will move upwardly, transferring its weight upon the article to be stapled. Actuating rod 66 remains stationary and as a result spring 67 extends to decrease the closing force exerted on the needle valve 58 to the point where the pressure acting on the needle valve will produce opening movement thereof.

Alternate types of control assemblies are shown in Figs. 4, 5 and 6 and are generally designated 44A, 44B and 44C respectively.

The control assembly of Fig. 4 is primarliy designed for manual operation. The plug 46A thereof is drilled to receive a poppet valve 72 having a square shank 73 and an actuating button 74. This valve is normally urged to closed position by a spring 75 and by the pressure in chamber 50 acting against the end 76 of the valve. Spring 75 is selected primarily for proper sensitivity since the pressure factor alone is practically enough for closing valve movement. This type of control sub-assembly would be used on a hand stapling gun such as disclosed in the co-pending application of Messrs. Campbell, Schoening and Reiterman, Serial Number 521,455, filed July 12, 1955, now patent 2,850,738 issued September 9, 1958.

Control assembly 44B is designed for either manual operation or operation in response to movement between the gun and some type of control such as a cam. A poppet valve 78 is included and is connected to an actuating rod 79 which may be of any length desired. Valve 78 is normally urged to closed position by a spring 80 which again is selected primarily from a standpoint of proper sensitivity.

Control assembly 44C includes a poppet valve 82 somewhat similar to valve 72 except that it is connected to a member 83 which moves in response to the energization of a solenoid 84. Again a spring 85 is included for normally urging the valve 82 to closed position. Since a very light spring is sufficient, it becomes possible to use a relatively small solenoid such as can practicably be fitted within the plug 46C.

While preferred embodiments have been described above in detail, it will be understood that numerous modifications might be resorted to without departing from the scope of my invention as defined in the following claims:

I claim:

1. Triggering means for a pneumatic fastener driver comprising a sleeve; inlet, outlet and exhaust ports formed through the wall of said sleeve, said ports each being spaced longitudinally along said sleeve, a closure member at each end of said sleeve, a valve mounted in said sleeve for longitudinal sliding movement, one end of said valve having a poppet head, the other end of said valve having a land of lesser effective transverse area than the under side of said poppet head, a valve seat member interposed between said inlet and outlet ports and coacting with the head of said valve to normally seal said inlet port from said outlet port, a second valve seat member interposed between said outlet and exhaust ports and coacting with said lesser land to normally connect said exhaust port with said outlet port, means venting one end of said sleeve to atmosphere through one of said closure members, the other of said closure members normally sealing the other end of said sleeve and including selectively operable means for venting the other end of said sleeve to atmosphere.

2. Valve means for controlling the operation of a pneumatic power tool comprising a valve body, a control assembly detachably mounted on one end thereof, inlet and outlet ports formed through the wall of said valve body, a valve member mounted for reciprocating movement in said valve body between closed and opened positions, said valve member being constructed to provide a passage between said ports when in opened position, said valve member having a head including a pair of oppositely disposed force transmitting surfaces, one of said surfaces being exposed to metered inlet pressure, the other of said surfaces having a lesser area and being directly exposed to inlet pressure, a seat in said valve body engageable by the other of said surfaces, and means carried by said control assembly for regulating the pressure on the first of said surfaces to produce a force differential on said valve member in a direction of opening or closing movement thereof.

3. Valve means for controlling the operation of a pneumatic power tool comprising a cylindrical valve body, a control assembly detachably mounted on one end thereof, inlet and outlet ports formed in longitudinally spaced relation through the wall of said valve body, a valve seat located intermediate said ports, a valve member mounted for reciprocating movement in said valve body between closed and opened positions, a valve element carried by said valve member for abutting axial sealing engagement with said valve seat in the closed position of said valve member, a pair of oppositely disposed force transmitting surfaces on said valve member, one of said surfaces being exposed to metered inlet pressure, the other of said surfaces having a lesser area and being directly exposed to inlet pressure, and means carried by said control assembly for regulating the pressure on the first of said surfaces to produce a force differential on said valve member in a direction of opening or closing movement thereof.

4. Power tool control valve means according to claim 3 wherein the regulating means carried by said control assembly includes a valve, a spring normally urging said valve to closed position, and a member associated with said valve for selectively moving it to opened position, at least a portion of said member projecting externally of said control assembly.

5. Power tool control valve means according to claim 3 wherein the regulating means carried by said control assembly includes a valve, a spring normally urging said valve to closed position, and means for reducing the force exerted by said spring to a level where said control assembly valve is moved to open position by inlet pressure in said valve body.

6. Power tool control valve means according to claim 5 wherein the means for reducing the force exerted by said spring comprises an actuating member carried by the power tool for movement relative thereto, said spring being interposed between said actuating member and said control assembly valve whereby said valve will be moved to opened position in response to separating movement between said actuating member and said control assembly valve.

7. Power tool control valve means according to claim 3 wherein said valve element comprises a resilient member.

8. Power tool control valve means according to claim 7 wherein said resilient member forms at least a portion of the other of said surfaces.

9. Power tool control valve means according to claim 3 further characterized by said valve member being provided with a third surface exposed to inlet pressure in the open position of said valve member and disposed to cause closing movement thereof.

10. A valve for controlling the operation of a pneumatically actuated power tool comprising a tubular valve body, inlet, outlet and exhaust ports formed through the wall of said valve body, said ports being spaced longitudinally along said valve body, a plurality of annular members inserted within and secured to the inner wall of said valve body, said annular members including a valve seat member positioned intermediate said inlet and outlet ports, a second valve seat member positioned between said outlet and exhaust ports, a pair of longitudinally spaced valve supporting members, and an internally threaded member positioned adjacent one end of said valve body, a main valve slidably engaging said pair of valve supporting members for movement between closed and open positions, said main valve including a portion co-acting with said first named valve seat member to close the passage between said inlet and outlet ports in the closed position of said main valve and a second portion co-acting with said second valve seat member to close the passage between said outlet and exhaust ports in the open position of said main valve, said main valve being provided with at least two force transmitting surfaces transverse to the direction of movement, said surfaces comprising a first surface exposed to metered inlet pressure and disposed to cause closing movement of said main valve and a second surface of lesser area than said first surface exposed to inlet pressure and disposed to cause opening movement of said main valve, a control assembly including a threaded portion engageable with said internally threaded member to normally close one end of said valve body, and selectively operable means carried by said control assembly for venting said first surface to atmosphere whereby inlet pressure acting against said second surface can produce a force sufficient to move said main valve into opened position.

References Cited in the file of this patent
UNITED STATES PATENTS 2,722,234     MacGeorge et al.     Nov. 1, 1955